(12) United States Patent
Ra et al.

(10) Patent No.: US 11,121,980 B2
(45) Date of Patent: *Sep. 14, 2021

(54) DYNAMIC PROVISIONING OF STORAGE IN THE CLOUD

(71) Applicant: AT&T Intellectual Property I, L.P., Atlanta, GA (US)

(72) Inventors: Moo-Ryong Ra, Basking Ridge, NJ (US); Hee Won Lee, Basking Ridge, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/734,019

(22) Filed: Jan. 3, 2020

(65) Prior Publication Data

US 2020/0145346 A1 May 7, 2020

Related U.S. Application Data

(63) Continuation of application No. 15/236,621, filed on Aug. 15, 2016, now Pat. No. 10,530,703.

(51) Int. Cl.
*H04L 12/911* (2013.01)
*H04L 29/08* (2006.01)
*H04L 12/24* (2006.01)

(52) U.S. Cl.
CPC .......... *H04L 47/70* (2013.01); *H04L 41/0896* (2013.01); *H04L 47/781* (2013.01); *H04L 67/10* (2013.01); *H04L 67/1097* (2013.01); *H04L 67/2809* (2013.01); *H04L 67/32* (2013.01); *H04L 41/5009* (2013.01); *H04L 41/5054* (2013.01); *H04L 41/5096* (2013.01)

(58) Field of Classification Search
CPC ........ H04L 47/00–47/70; H04L 65/00–65/80; H04L 67/10–67/1097
See application file for complete search history.

(56) References Cited

U.S. PATENT DOCUMENTS

| | | | |
|---|---|---|---|
| 7,693,970 B2 * | 4/2010 | Eidler | G06F 21/6245 709/223 |
| 8,489,812 B2 | 7/2013 | Chavda et al. | |
| 8,712,982 B2 | 4/2014 | Holt et al. | |
| 8,874,848 B2 | 10/2014 | Soundararajan et al. | |
| 8,898,663 B2 | 11/2014 | Vemuri et al. | |
| 8,935,493 B1 | 1/2015 | Dolan et al. | |
| 8,966,175 B2 | 2/2015 | Chavda et al. | |
| 8,984,243 B1 * | 3/2015 | Chen | G06F 3/0631 711/162 |
| 9,053,167 B1 | 6/2015 | Swift et al. | |

(Continued)

OTHER PUBLICATIONS

Corradi et al.; "VM Consolidation: A real case based on OpenStack Cloud"; Future Generation Systems; vol. 32; 2014; p. 118-127.

(Continued)

*Primary Examiner* — Clayton R Williams
(74) *Attorney, Agent, or Firm* — BakerHostetler

(57) ABSTRACT

A system may dynamically provision an underlying storage implementation for cloud storage, such as cloud block storage services. They system allows for deferral of the storage provisioning process to the time at which a tenant actually requests a storage space.

20 Claims, 11 Drawing Sheets

(56) References Cited

U.S. PATENT DOCUMENTS

| | | | |
|---|---|---|---|
| 9,311,001 B1 | 4/2016 | Glade et al. | |
| 2009/0019535 A1* | 1/2009 | Mishra | G06Q 30/04 726/12 |
| 2011/0022642 A1* | 1/2011 | deMilo | G06F 21/602 707/805 |
| 2012/0331224 A1 | 12/2012 | Jones et al. | |
| 2013/0073806 A1 | 3/2013 | Xavier et al. | |
| 2013/0332614 A1 | 12/2013 | Brunk et al. | |
| 2014/0215590 A1 | 7/2014 | Brand | |
| 2015/0067171 A1* | 3/2015 | Yum | H04L 67/2809 709/226 |
| 2015/0127834 A1 | 5/2015 | Udupi et al. | |
| 2015/0362983 A1 | 12/2015 | Frick | |
| 2016/0085481 A1 | 3/2016 | Antony et al. | |
| 2017/0026469 A1* | 1/2017 | Usgaonkar | H04L 67/1097 |

OTHER PUBLICATIONS

Wuhib et al.; "Dynamic Resource Allocation with Management Objectives—Implementation for an OpenStack Cloud"; KTH Technical Report; IEEE $8^{th}$ Int'l Conference Workshop on Systems Virtualization Management; 2012; 8 pages.

* cited by examiner

DYNAMIC PROVISIONING OF STORAGE IN THE CLOUD

CROSS-REFERENCE TO RELATED APPLICATIONS

This application is a continuation of and claims the benefit of U.S. patent application Ser. No. 15/236,621, filed Aug. 15, 2016, entitled "Dynamic Provisioning Of Storage In The Cloud", the contents of which are hereby incorporated by reference herein in its entirety.

TECHNICAL FIELD

The technical field generally relates to storage, more specifically, to systems and methods for cloud storage provisioning.

BACKGROUND

For enterprise storage solutions, vendors drive an appliance-based model that typically provide proprietary software and customized hardware to support a specific class of applications (e.g., database) or a specific layer of storage stack (e.g., NFS storage, SAN block storage, etc.). However, since many different tenant or storage applications will share the same infrastructure in the cloud setting, the underlying storage implementation should be able to be adapted for active tenants. Unfortunately, despite the fact that many recent technological advances have been made in controlling pools of compute, storage, and networking resources in the cloud, it is still the case that the infrastructure providers decide hardware configuration before deploying a cloud infrastructure. For instance, the OpenStack Cinder service, which governs block storage management tasks, mandates a preconfigured storage implementation before the operation, e.g., through local RAID configuration, vendor appliances/solutions, etc. In a multi-tenant cloud environment, in particular, the static nature of the storage provisioning practice can cause many significant problems for meeting tenant application requirements, which often come later into the picture.

SUMMARY

Disclosed herein are systems, methods, and apparatuses that enable the dynamic creation of underlying storage implementation in the cloud. A system may dynamically provision an underlying storage implementation for cloud storage, such as cloud block storage services. The system allows for deferral of the storage provisioning process to the time at which a tenant actually requests a storage space. The late binding may offer high flexibility to the cloud service providers, thereby resulting in higher utilization. The system may implement mechanisms, such as admission control and dynamic throttling, to provide quality of service on performance among tenant applications. The system can satisfy heterogeneous tenant requests even with considerably limited storage resources and perform a proper admission control for allocating IOPS per volume.

In an example, dynamic provisioning of backend block storage in the cloud may be done use the following apparatus. An apparatus may include a processor and a memory coupled with the processor that effectuates operations. The operations may include receiving a first request of a plurality of requests associated with a cloud storage. The operations may further include selecting a first node of a plurality of nodes based on information associated with the first request. The operations may further include configuring the first node based on information associated with the first request to create a first storage implementation on the first node to support the first request. The operations may further include receiving a second request of the plurality of requests associated with the cloud storage. The operations may further include selecting the first node based on information associated with the second request. The operations may further include configuring the first node based on information associated with the second request to create a second storage implementation on the first node to support the second request.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Aspects of the herein described telecommunications network and systems and methods for antenna switching based on device position are described more fully with reference to the accompanying drawings, which provide examples. In the following description, for purposes of explanation, numerous specific details are set forth in order to provide an understanding of the variations in implementing the disclosed technology. However, the instant disclosure may take many different forms and should not be construed as limited to the examples set forth herein. When practical, like numbers refer to like elements throughout.

DETAILED DESCRIPTION

Figure 1:
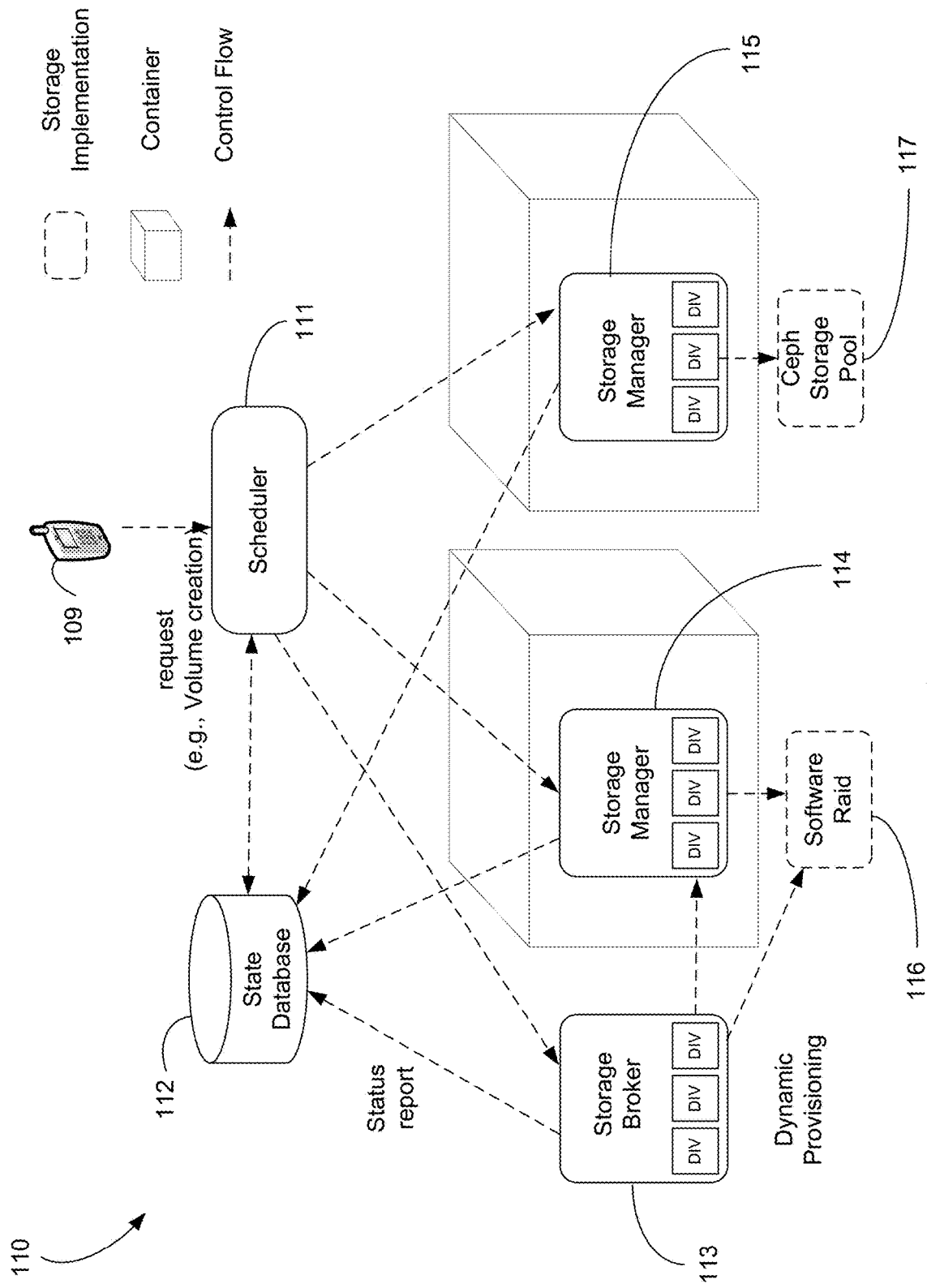
FIG. 1 illustrates an exemplary system (IOArbiter) for dynamic provisioning of backend block storage in the cloud.

With the advent of virtualization technology, cloud computing realizes on-demand computing. Despite many technological advances in related areas, however, it is still the case that the infrastructure providers must decide hardware configuration before deploying a cloud infrastructure. This static nature of the storage provisioning practice can cause many significant problems in meeting tenant requirements, which often come later into the picture. Also, conventional implementations usually provide one storage implementation per node. Disclosed herein are systems, methods, and apparatuses that enable the dynamic creation of underlying storage implementation in the cloud, hereinafter the process is generally called IOArbiter. IOArbiter defers storage provisioning to the time at which a tenant actually requests a storage space. As a result, an underlying storage implementation (e.g., RAID-5/6 or Ceph storage pool with (6, 3) erasure coding) may be materialized at the volume creation time. IOArbiter can simultaneously satisfy a number of different tenant demands, which may not be possible with a static configuration. Additionally, built-in quality of service (QoS) mechanisms, including admission control and dynamic throttling, help IOArbiter system mitigate a noisy neighbor problem among tenants. The capability of dynamic resource provisioning may be driving factor for users to adopt cloud technology. A tenant may create a virtual infrastructure based on their exact needs in a much shorter amount of time and the amount of provisioned resources may be adjusted anytime from anywhere by the tenant. Dynamic resource provisioning may also allow cloud infrastructure providers to improve the overall expense (CapEx/OpEx) for running cloud infrastructure.

Table 1 illustrates an example of a conventional solution in view of the dynamic solution discussed herein. Consider two applications. One application is a Virtual Desktop Infrastructure (VDI) application and provides a virtual desktop environment for corporate employees through VMs (virtual machines) in the cloud. It requires reliable storage, and consequently demands triple (3x) replication strategy, which is a common industry practice. The other application, vCDN, is a virtualized Content Delivery Network (CDN) application. Unlike the VDI application, vCDN implements triple redundancy in its application layer. In this case, since the application replicates data across three data centers, it is not necessary for underlying storage systems to provide any additional redundancy. Suppose that we first deployed the VDI application to the cloud, and after some time deploy the vCDN application in the same cloud infrastructure.

TABLE 1

| Application | Single Storage Implementation | Dynamic Provisioning |
|---|---|---|
| VDI that requires 3x redundancy from underlying storage systems | 3x | 3x |
| vCDN that implements 3x redundancy in the application layer | 9x | 3x |
| Total Storage Overhead | 12x | 6x |

Since the architects only knew about the VDI application when they designed the infrastructure, they implemented storage systems based on the triple replication strategy. Even though the vCDN application, which comes later into the picture, does not require an additional redundancy, it needs to be deployed into the same infrastructure. As a result, a significant amount of storage space is unnecessarily consumed, i.e., 12x vs. 6x in the table. In many practical scenarios, it is not easy to avoid this kind of situation due to the rigid nature of storage services. However, if we can somehow configure the underlying storage parameters dynamically, e.g., this problem might be resolved as depicted in Table I. In this particular example, total storage overhead of a single storage implementation is twice as much as the dynamically implemented case.

FIG. 1 illustrates an exemplary system 110 (IOArbiter) for dynamic provisioning of backend block storage in the cloud. The components of system 110 may be located on one device or distributed over multiple devices. Scheduler 111 may be communicatively connected with state database 112, storage broker 113, storage manager 114, and storage manager 115. Storage manager 114 and storage manager 115 may communicate with storage implementation 116 (e.g., Software RAID) and storage implementation 117 (Ceph storage pool), respectively. A storage implementation may be a RAID configuration based on local disks, a storage pool based on a distributed storage system like Ceph, or a storage vendor solution (e.g., EMC VMAX, all flash arrays such as SolidFire, Pure storage, etc.), among other things. When block storage is requested (e.g., from mobile device 109), which may be through representational state transfer (REST) application programming interface (API) calls, Scheduler 111 determines which storage node (e.g., server) should handle a given request (e.g., volume creation or volume deletion). Storage broker 113, storage manager 114, and storage manager 115 may report their states to state database 112. Storage broker 113 may create a storage implementation (e.g., storage implementation 116 or storage implementation 117) when there is not one and may create a corresponding storage manager (e.g., storage manager 114 or storage manager 115) for the storage implementation. Storage manager 114, for example, may execute actual storage commands, such as creating or deleting a logical volume at a storage implementation, or attaching or detaching it from virtual machines (VMs), among other things. IOArbiter system 110 may use container technology (e.g., Linux containers—LXC) to isolate a newly created control path of a storage manager, such as storage manager 116. Containers look like VMs. For example, containers may have private space for processing, may execute commands as root, may have a private network interface and IP address, may allow custom routes and iptable rules, or may mount file systems, among other things. A difference between containers and VMs is that containers may share the host system's kernel with other containers.

Figure 2:
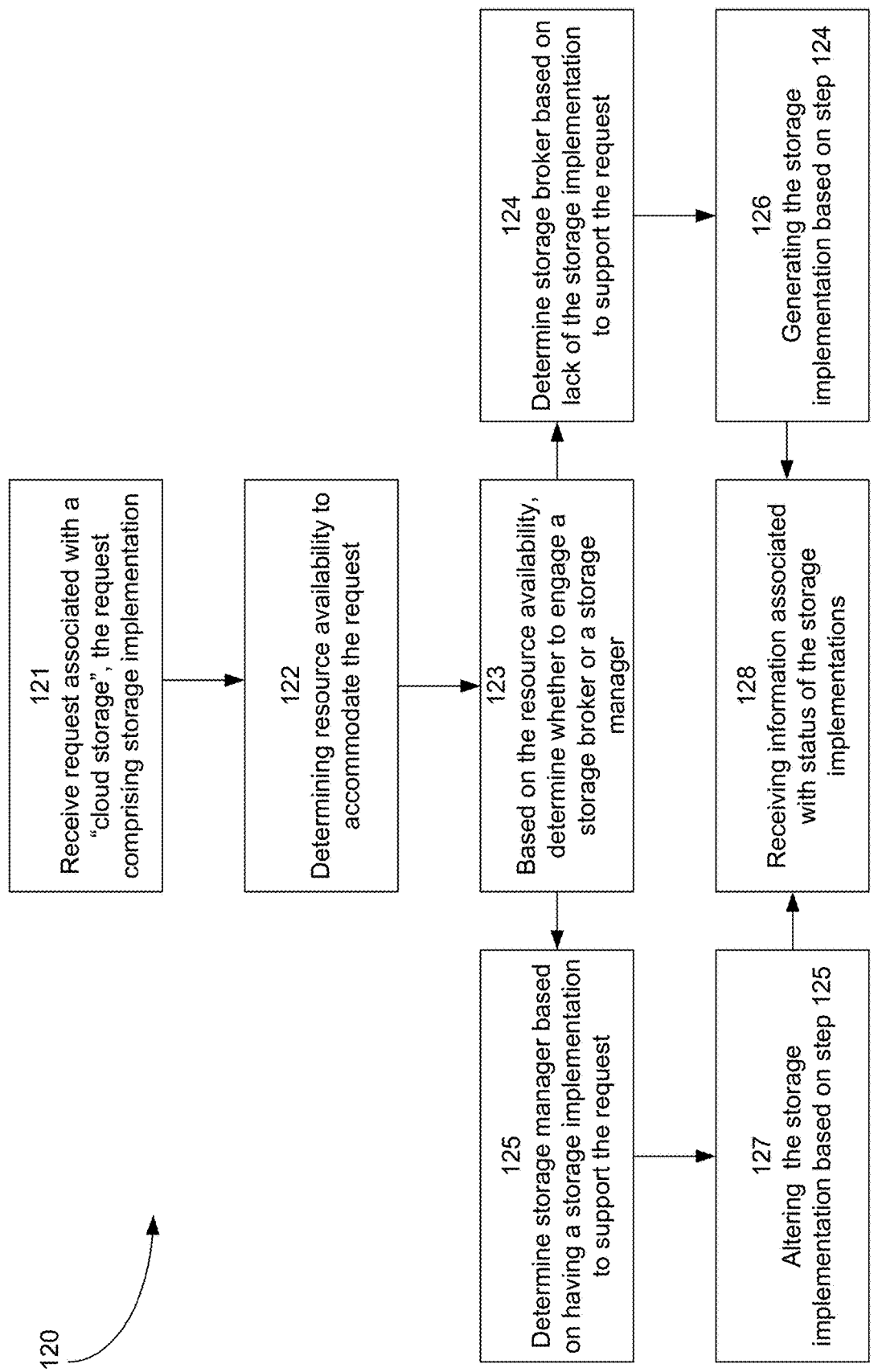
FIG. 2 illustrates an exemplary method for dynamic provisioning of storage in the cloud.

FIG. 2 illustrates an exemplary method 120 for dynamic provisioning of storage in the cloud. At step 121, a request associated with cloud storage is received. The request may include information associated with a storage implementation. The request may include information, such as how much a volume is replicated (e.g., triple replicated), minimum input/output operations per second (e.g., 100 minimum input/output operations per second—IOPS), or local discs/storage pools (RAID/Ceph), among other things. In an example, the request of step 121 may have a set of user-defined key-value pairs, e.g., {redundancy=5, min-iops=100, iosize=4 k, . . . }. Scheduler 111 may receive the request of step 121. At step 122, in response to receiving the request of step 121, there may be a determination of resource availability to accommodate the request. Schedule 111 may determine the resource availability. At step 123, based on the resource availability of step 122, there may be a determination on whether to engage a storage broker (e.g., create a storage implementation—step 126) or a storage manager (e.g., alter an existing storage implementation—step 127).

At step 124, there may be a determination that a storage broker should be engaged because of a lack of a storage implementation (e.g., storage implementation 116) that may support the request. At step 125, there may be a determination that a storage manager should be engaged because of a storage implementation (e.g., storage implementation 117)

that may support the request. At step 126, instructions may be provided to generate the storage implementation 116 based on the determination of step 124. For example, due to the absence of resources, storage broker 113, based on the information of the request of step 121, may create a new storage implementation 116. At step 127, instructions may be provided to alter the storage implementation 117 based on the determination of step 125. For example, if storage implementation 117 can support the request, scheduler 111 may route the request to the available storage manager 115. At step 128, information associated with the status of the storage implementation 116 or storage implementation 117 is received. Once instantiated, storage broker 113 and storage manager 114 or storage manager 115 may report their states to state database 112, so that scheduler may perform scheduling actions. A message from storage broker 113 to state database 112 may have information about raw resources for which the storage broker 113 is responsible. For example, the information may include the number of disks, disk types, or mediums in case of a software RAID-based storage implementation. The message from storage managers (e.g., storage manager 115) may include more specific information associated with storage implementation 117. The specific information may include the number of logical volumes already created in storage implementation 117, total performance budget and allocated resources, or capacity status, among other things.

Figure 3:
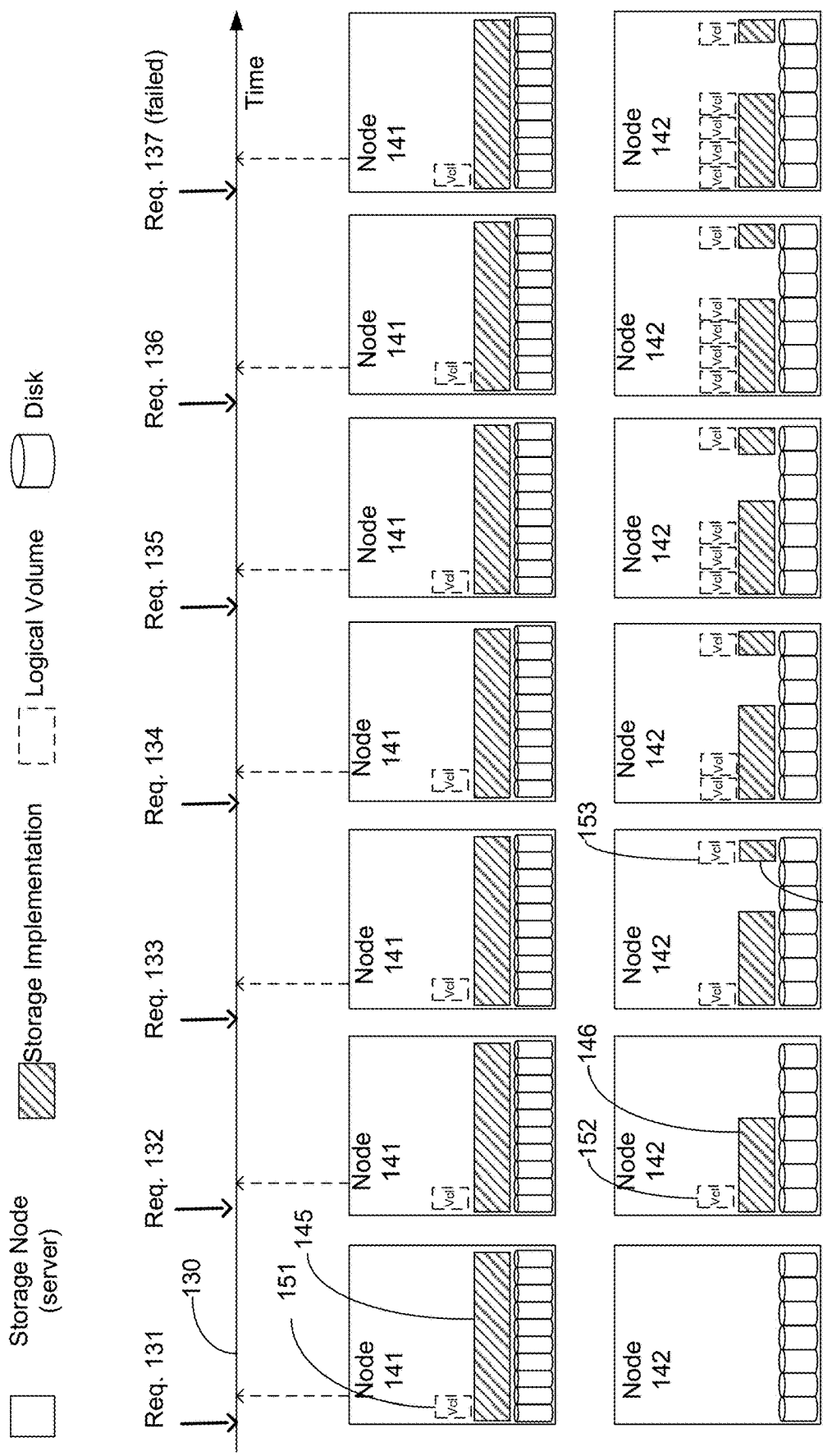
FIG. 3 illustrates an example flow of dynamic provisioning of a storage implementation.

FIG. 3 illustrates dynamic provisioning of a storage implementation and admission control in consideration of information as shown in Table 2 and Table 3 below. FIG. 3 provides a timeline 130 and a plurality of requests (request 131—request 137) along the timeline, wherein each request is issued every 90 seconds. The requests may result in corresponding configurations of a node, such as node 141 (10 disks) or node 142 (7 disks). In this example, the two nodes 141 and 142 have 10 and 7 local hard disk drives (HDDs), respectively, each of which has 1 TB of storage capacity. Table 2 shows different volume types, types 1-3. For example, a cloud storage provider may have particular types (i.e., predetermined types) of volumes that it will support in its cloud architecture for dynamic provisioning. Table 3 shows what may show some of the information that may be in the requests of FIG. 3, such as request 131. For example, request 131 in Table 3 is of a type 1, which has RAID configuration with a fixed number of disks (10), and 100 gigabytes (G or GB herein) for the requested storage space.

TABLE 2

| Volume Type | Property of storage implementation |
| --- | --- |
| Type 1 | RAID-5 based on 10 disks. |
| Type 2 | RAID-6 based on 4 disks. 100 IOPS. |
| Type 3 | JBOD based on a single disk. |

TABLE 3

| | Request # | | | | | | |
| --- | --- | --- | --- | --- | --- | --- | --- |
| | 131 | 132 | 133 | 134 | 135 | 136 | 137 |
| Information | Type 1 | Type 2 | Type 3 | Type 2 | Type 2 | Type 2 | Type 2 |
| | 100 G | 100 G | 100 G | 100 G | 100 G | 100 G | 100 G |

With continued reference to FIG. 3, request 131 includes information such as type 1 and 100 GB of storage space. As discussed in FIG. 2, IOArbiter system 110 goes through a plurality of steps to determine how to proceed. Type 1 volume indicates a storage implementation of RAID-5 based on 10 disks. Based on the available nodes (node 141 and node 142), only node 141 has the number of disks to implement a volume of type 1. Therefore, storage implementation 145 is created with a volume 151 on node 141. Next, request 132 includes information such as type 2 and 100 GB of storage space. Type 2 volume indicates a storage implementation of RAID-6 based on 4 disks and 100 IOPS. Based on the available nodes (node 141 and node 142), only node 142 has the number of disks available to implement a volume of type 2. It is assumed here that node 142 has the requested minimum IOPS as well. Therefore, storage implementation 146 is created with a volume 152 on node 142 and node 141 remains the same. Request 133 includes information such as type 3 and 100 GB of storage space. Type 3 volume indicates a storage implementation of JBOD based on a single disk. Based on the available nodes (node 141 and node 142), only node 142 has the number of disks available to implement a volume of type 3. Therefore, storage implementation 147 is created with a volume 153 on node 142.

With continued reference to FIG. 3, request 134-request 136 are all requests for a volume of type 2. Storage implementation 146 is available and meets the requested criteria; therefore, another storage implementation is not created, but just an additional volume in correspondence with the storage implementation 146 on node 142. Request 137 is an example of a failed request. Request 137 includes information such as type 2 and 100 GB of storage space. Type 2 volume indicates a storage implementation of RAID-6 based on 4 disks and 100 IOPS. After consideration of node 141 and node 142, none meet the criteria requested. Recall that RAID-6 based on 4 disks (on node 142) has 400 IOPS of a total performance budget. Therefore request 137 failed due to a budget constraint. The above in relation to FIG. 3 and Table 2 and Table 3 show that IOArbiter system 110 may dynamically create storage implementations to satisfy heterogeneous requests (e.g., request 141, request 142, and request 143). In addition, it demonstrates that IOArbiter system 110 may allocate IOPS correctly (Req. 137 failed due to the budget constraint). Our offline profiles tell us that we could use 400 IOPS (for 4 k-block random read/write) per Type-2 storage implementation as a total performance budget. All of the IOPS are consumed by previous requests, i.e., each request has a 100 IOPS requirement and there are 4 of them. Contrary to most conventional cloud storage architectures that require a different storage implementation per node, the system discussed herein allows for multiple storage implementations in a node (e.g., node 142). Also note that a node may be a server (one device), it may also be separate devices which may include servers, drives, controllers, etc.

Discussed below are additional considerations for dynamic provisioning of cloud storage as discussed herein. IOArbiter system 110 may enable the dynamic creation of underlying storage implementation in the cloud. IOArbiter system 110 may defer the implementation of underlying storage to the volume creation time, i.e., the time at which a tenant actually requests a storage space. To avoid creating an overwhelming design space, a cloud infrastructure provider using the IOArbiter system 110 may define a customized set of storage implementation types so as to incorporate a range of performance and reliability levels, e.g., RAID-5 or 6 with a minimum of 200 IOPS, Ceph with (6, 3) or (10, 4) erasure coding, etc. When a tenant request, e.g., volume creation, is received by IOArbiter system 110, IOArbiter system 110 may analyze the request and automatically create a necessary storage implementation if it is not yet available in the infrastructure, e.g., RAID-5 with 6 disks or Ceph with (10, 4) erasure coding, etc. As a management layer of cloud block storage services, IOArbiter system 110 may have service that include a) an ability to perform garbage collection, e.g., reclaiming unused space and/or a storage implementation, b) an admission control and dynamic throttling mechanism that enables per-VM IOPS allocation, and c) a containerized control plane, which may assist with maintenance.

The cinder-volume uses a local configuration file (cinder.conf) to configure and maintain its internal states. IOArbiter inserts an additional information in that file for our admission control mechanism. When a containerized storage implementation 116 is created, storage broker 113 may insert pre-computed performance budget into a file inside the container (e.g., storage manager 114). Those budget numbers may be based on offline profiles and specific to a given storage implementation 114. After that, budget accounting operations may be done by scheduler 111 based on the reported information from the containerized storage manager 114. Dynamic throttling service may be instantiated inside each container (storage manager 114), run as a daemon process, and periodically collect block device performance in case of software-RAID based storage implementation 116. When an SLA violation is observed, the IOArbiter system 110 may throttle other storage traffic sharing the storage implementation.

IOArbiter system 110 may allow for late binding and non-intrusiveness. With regard to late binding, with this principle, a storage implementation may be bound to the cloud infrastructure at the request time, i.e., volume creation time. Storage medium may be provided as a bunch of raw disks with a state ready to be configured or a vanilla Ceph installation without any configured storage pools. Then, any relevant storage implementation will be created when necessary, e.g., a RAID for the former (bunch of raw disks) example and a storage pool for the latter (vanilla Ceph install) example. With regard to non-intrusiveness, since IOArbiter is aimed to be deployed in production clusters, it is desirable to minimize probable impacts on existing components. In an example scenario, IOArbiter may be implemented as a filter and driver for a Cinder service rather than making the system as a separate stand-alone service. With this approach, IOArbiter can more naturally integrate with existing components, and consequently minimize potential incompatibility problems. In addition, a container technology may be exploited to isolate a newly created storage implementation. This decision helps ensure a dedicated agent per storage implementation, and thereby isolates the instance from other storage implementations. As a result, the system administrator may, with greater ease, enable or disable the storage implementation as needed. Most failures in a given storage implementation will not affect other storage implementations.

IOArbiter is intended to be deployed for multi-tenant cloud environments. In this context, performance isolation should be appropriately deal with. IOArbiter provides features such as admission control based on offline profiles and dynamic throttling based on runtime characteristics. With regard to admission control, when a new storage implementation (e.g., storage implementation 116) is created, a containerized storage manager 114 may be created along with it. At that time, IOArbiter system 110 ensures that new storage manager 114 has a total performance budget for that particular storage implementation. For instance, if the storage implementation is based on a single SATA HDD, IOArbiter system 110 allocates approximately 200 for the worst-case 4 k-block IOPS budget. After that, whenever a new volume creation request comes into the system, storage manager 114 manages budgets and provides information about the remaining budgets to state database 112. This may help ensure that, if a budget is full for a given storage implementation (e.g., storage implementation 116, no more requests are issued to the corresponding storage manager 114.

With regard to dynamic throttling, although IOArbiter allocates performance, e.g., IOPS, based on the budget, it may be the case that some resource interference still happens among the allocated volume traffic. IOArbiter provides a dynamic throttling mechanism to mitigate the problem. IOArbiter may monitor runtime statistics (e.g., current IOPS) of each volume and, if the performance requirement (e.g., minimum IOPS) of a certain volume is violated, IOArbiter suppresses other flows sharing the same storage implementation based on their worst-case requirements. If no performance requirements are violated, throttling actions may be disabled.

Garbage collection is discussed below. Since IOArbiter encourages dynamic provisioning of storage implementation, there exists a concern with regard to resource fragmentation. To mitigate this problem, IOArbiter may periodically use a garbage collection mechanism. Based on the mechanism, IOArbiter is able to reclaim unused storage space, if any, or rebalance the skewed data in already deployed distributed storage systems. Resource fragmentation can make the infrastructure significantly underutilized. In our example in FIG. 3, suppose that sometime later if all the volumes in the storage implementation 146 are deleted. Then the underlying disks could be used for other purposes. To this end, background garbage collection mechanism referred above will periodically scan available resources, check the states of each storage implementation, and reclaim them if necessary. If we do not have such a mechanism, 4 disks configured underneath could be wasted until another Type-2 request comes in to the system.

IOArbiter system may be part of a control plane of cloud block storage. In a large-scale cloud infrastructure where thousands of nodes or more can be deployed, it is preferable to make a service both highly available and scalable. Making a centralized gateway highly available, balancing incoming traffic load uniformly across the available resources, and handling partitioned service resources are should be considered. IOArbiter may exploit an external service that is dedicated to the aforementioned.

IOArbiter provides additional intelligence for determining which host can satisfy a given requirement. In experiments, it turns out the overhead incurred by IOArbiter system was negligible.

Figure 4:
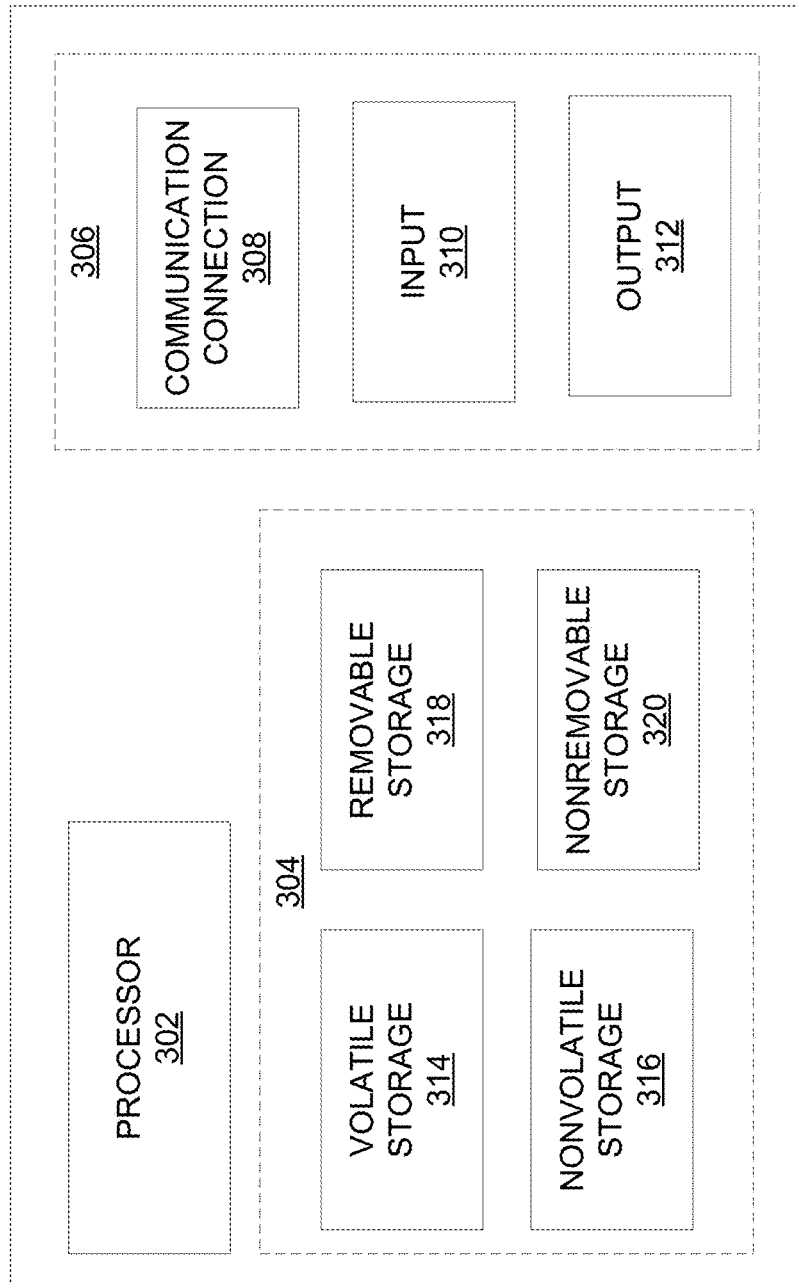
FIG. 4 illustrates a schematic of an exemplary network device.

FIG. 4 is a block diagram of network device 300 that may be connected to or comprise a component of system 110 or nodes 141 or 142, for example. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength. As evident from the description herein, network device 300 is not to be construed as software per se.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Accordingly, each portion of network device 300 is not to be construed as software per se. Input/output system 306 may be capable of receiving or providing information from or to a communications device or other network entities configured for telecommunications. For example, input/output system 306 may include a wireless communications (e.g., 3G/4G/GPS) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
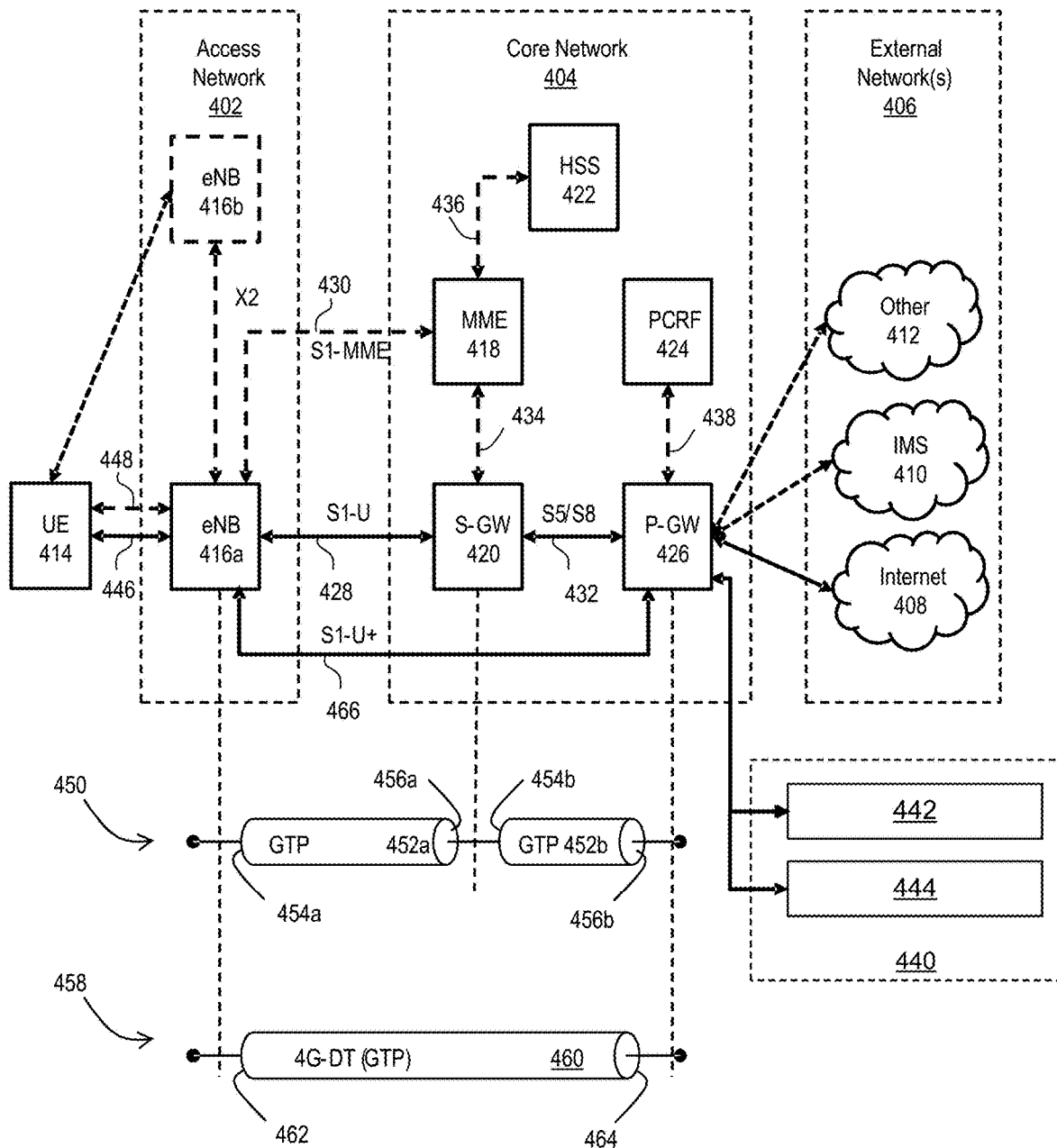
FIG. 5 illustrates an exemplary communication system that provides wireless telecommunication services over wireless communication networks.

FIG. 5 illustrates a functional block diagram depicting one example of an LTE-EPS network architecture 400 that may interact with dynamically provisioning a storage implementation for cloud storage as disclosed herein. In particular, the network architecture 400 disclosed herein is referred to as a modified LTE-EPS architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. In one embodiment, the LTE-EPS network architecture 400 includes an access network 402, a core network 404, e.g., an EPC or Common BackBone (CBB) and one or more external networks 406, sometimes referred to as PDN or peer entities. Different external networks 406 can be distinguished from each other by a respective network identifier, e.g., a label according to DNS naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as UE 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, VoIP, streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers, to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as VoIP; and (ii) non-guaranteed bit rate bearers that do not require guarantee bit rate, e.g., for applications, such as web browsing.

In one embodiment, the core network 404 includes various network entities, such as MME 418, SGW 420, Home Subscriber Server (HSS) 422, Policy and Charging Rules Function (PCRF) 424 and PGW 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Current Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 5. In other words, either or both of access network 402 and the core network 404 can include additional network elements that are not shown, such as various routers, switches and controllers. In addition, although FIG. 5 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 5. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 400, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between eNB 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456*b* corresponding to an S5-U address of PGW 426 (referred to herein as the PGW S5-U address).

In at least some embodiments, first tunnel solution 450 is referred to as a two-tunnel solution, e.g., according to the GPRS Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each PDP context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416*a* and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416*a* and PGW 426, by way of SGW 420. For example, SGW 420 can serve a relay function, by relaying packets between two tunnel endpoints 416*a*, 426. In other scenarios, direct tunneling solution 458 can forward user data packets between eNB 416*a* and PGW 426, by way of the S1 U+ interface, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual basis. For example, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416*a*. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 6:
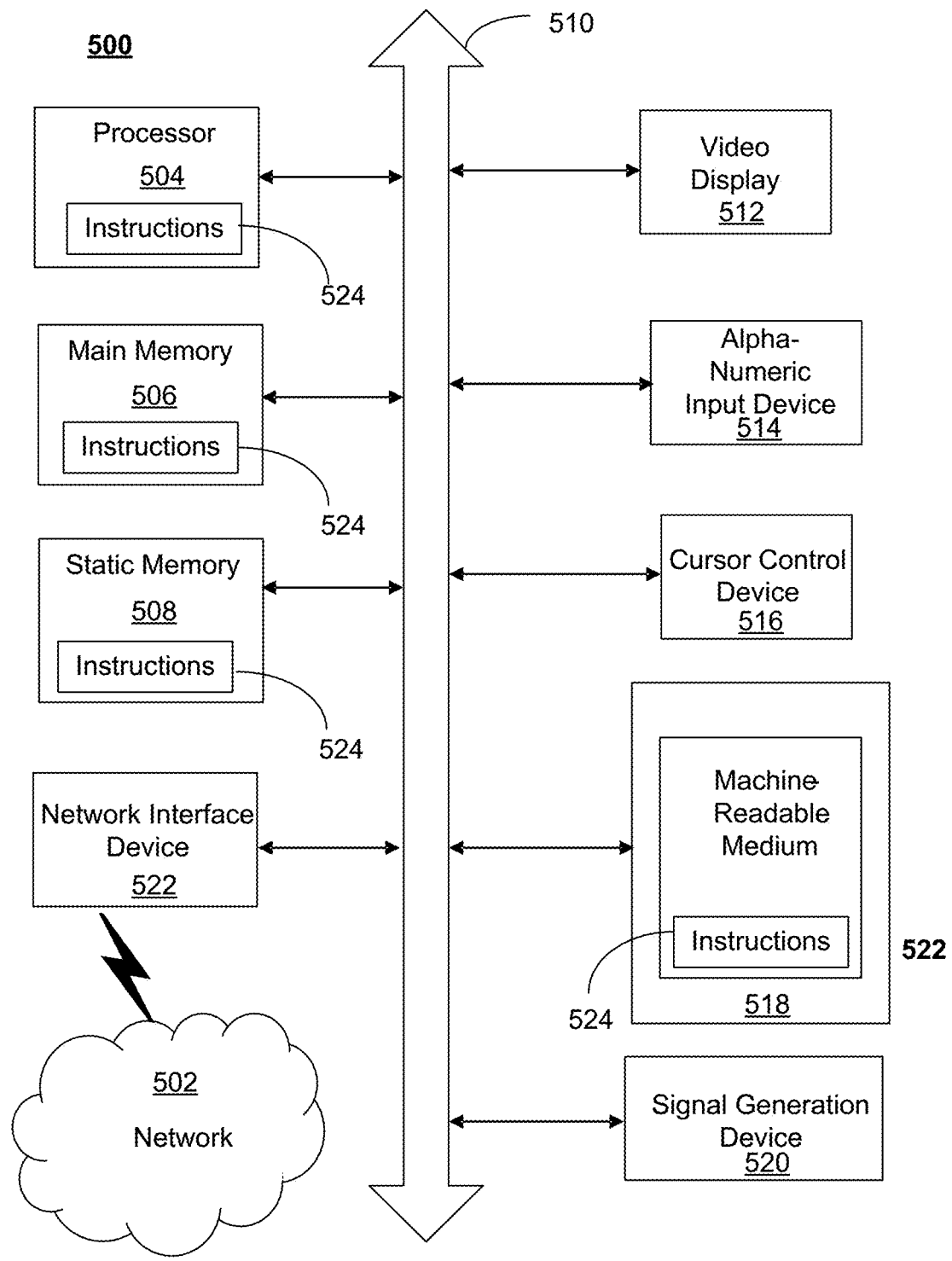
FIG. 6 illustrates an exemplary communication system that provides wireless telecommunication services over wireless communication networks.

FIG. 6 depicts an exemplary diagrammatic representation of a machine in the form of a computer system 500 within which a set of instructions, when executed, may cause the machine to perform dynamically provisioning a storage implementation for cloud storage as disclosed herein. One or more instances of the machine can operate, for example, as node 141, node 142, system 110 (or components thereof), processor 302, UE 414, eNB 416, MME 418, SGW 420, HSS 422, PCRF 424, PGW 426 and other devices of FIG. 1, FIG. 3, and FIG. 5. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid-state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512. Display units 512 may display information associated with dynamic provisioning of cloud storage as discussed with regard to FIG. 1-FIG. 3 (e.g., step 128).

The disk drive unit 518 may include a tangible computer-readable storage medium 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 7:
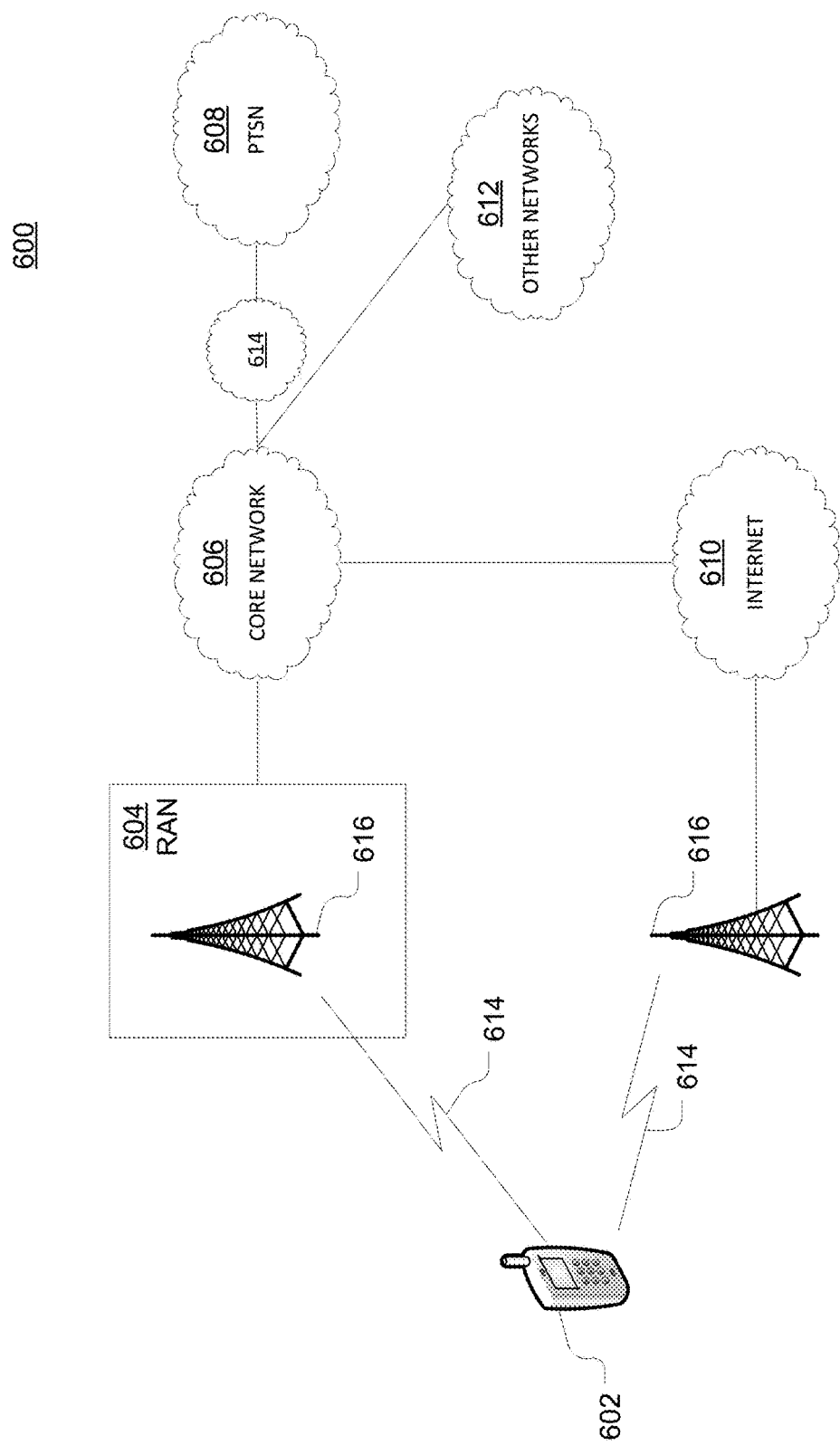
FIG. 7 illustrates an exemplary telecommunications system in which the disclosed methods and processes may be implemented.

As shown in FIG. 7, telecommunication system 600 may include wireless transmit/receive units (WTRUs) 602, a RAN 604, a core network 606, a public switched telephone network (PSTN) 608, the Internet 610, or other networks 612, though it will be appreciated that the disclosed examples contemplate any number of WTRUs, base stations, networks, or network elements. Each WTRU 602 may be any type of device configured to operate or communicate in a wireless environment. For example, a WTRU may comprise a mobile device 109 that requests cloud storage provisioning of system 110, a mobile device, network device 300, or the like, or any combination thereof. By way of example, WTRUs 602 may be configured to transmit or receive wireless signals and may include a UE, a mobile station, a fixed or mobile subscriber unit, a pager, a cellular telephone, a PDA, a smartphone, a laptop, a netbook, a personal computer, a wireless sensor, consumer electronics, or the like. It is understood that the exemplary devices above may overlap in their functionality and the terms are not necessarily mutually exclusive. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., RF, microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as CDMA, TDMA, FDMA, OFDMA, SC-FDMA, or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 602.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), GSM, Enhanced Data rates for GSM Evolution (EDGE), GSM EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 602.11 to establish a wireless local area network (WLAN). As another example, base station 616 and associated WTRUs 602 may implement a radio technology such as IEEE 602.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 7, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 7, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 614 to provide access to PSTN 608. Internet 610 may include a global system of interconnected computer networks or devices that use common communication protocols, such as the transmission control protocol (TCP), user datagram protocol (UDP), or IP in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. For example, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 8:
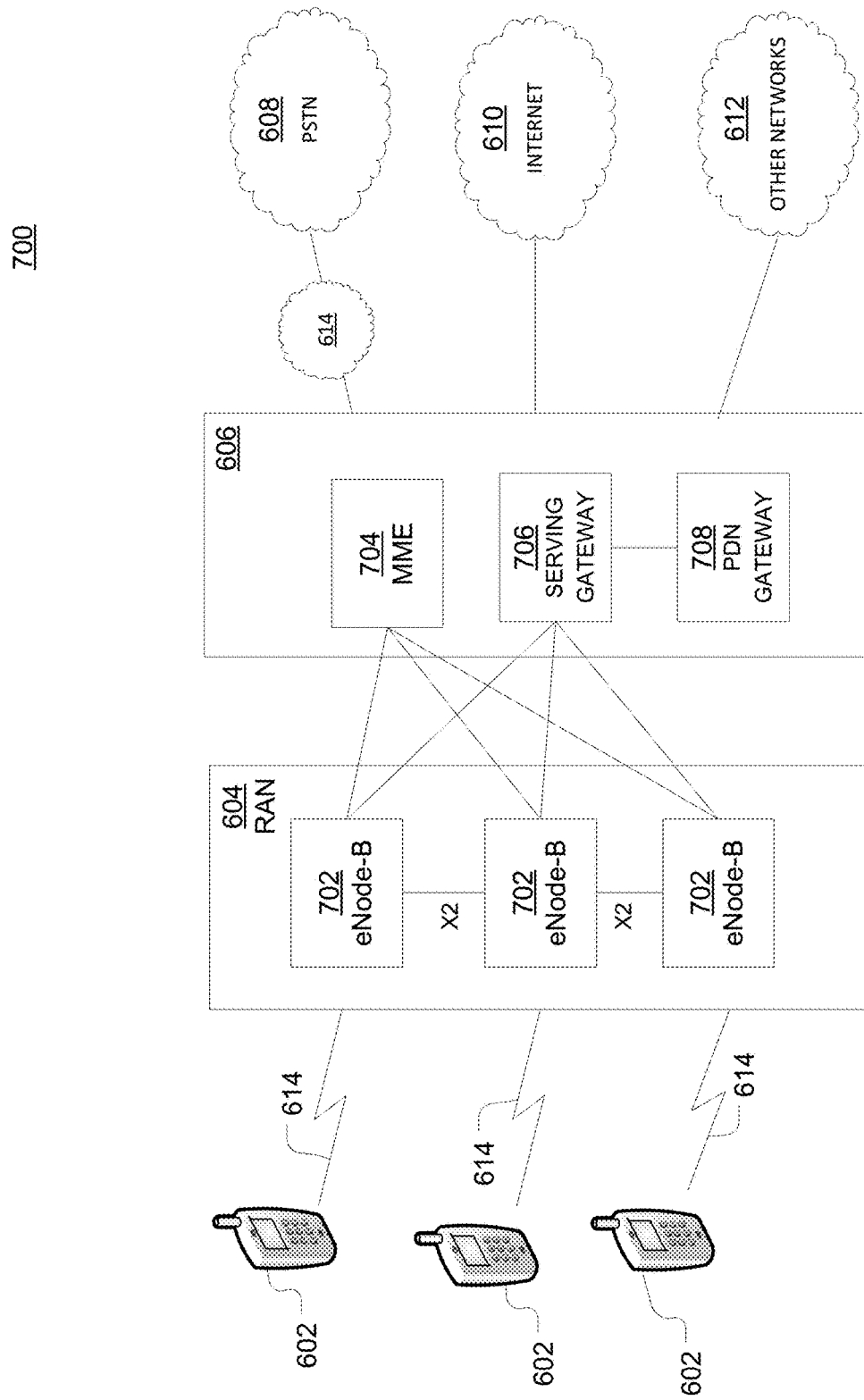
FIG. 8 illustrates an example system diagram of a radio access network and a core network.

FIG. 8 is an example system 400 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 8 eNode-Bs 702 may communicate with one another over an X2 interface.

Core network 606 shown in FIG. 8 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or WCDMA.

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 614, to facilitate communications between WTRUs 602 and traditional landline communications devices. In addition, core network 606 may provide the WTRUs 602 with access to other networks 612, which may include other wired or wireless networks that are owned or operated by other service providers. Other networks 612 may be the cloud network for storage associated with dynamic provisioning as discussed herein.

Figure 9:
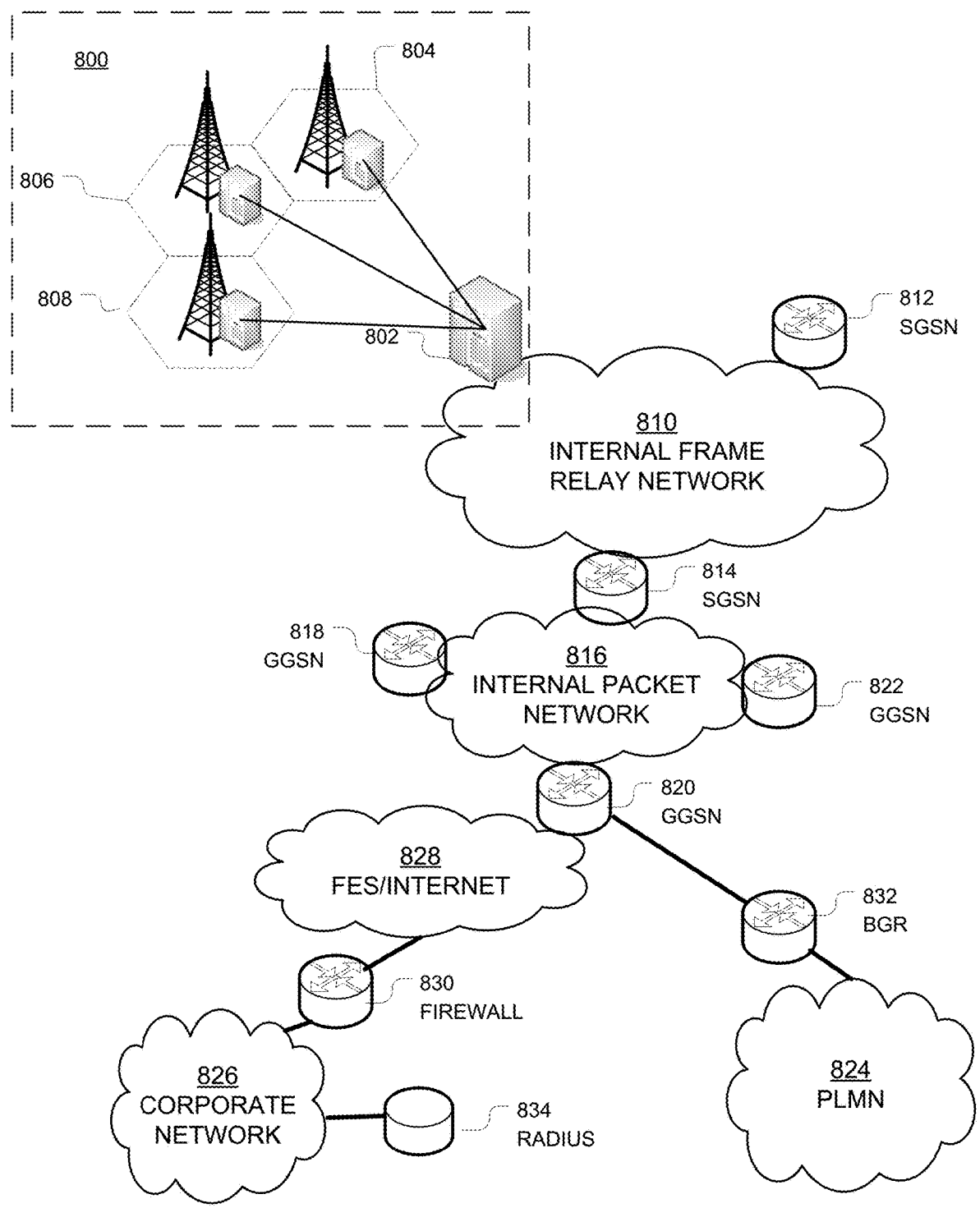
FIG. 9 depicts an overall block diagram of an example packet-based mobile cellular network environment, such as a general packet radio service (GPRS) network.

FIG. 9 depicts an overall block diagram of an example packet-based mobile cellular network environment, such as a GPRS network that may interact with the dynamic provisioning as discussed herein. In the example packet-based mobile cellular network environment shown in FIG. 9, there are a plurality of base station subsystems (BSS) 800 (only one is shown), each of which comprises a base station controller (BSC) 802 serving a plurality of BTSs, such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a service GPRS support nodes (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as PLMN 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a boarder gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells. The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 10:
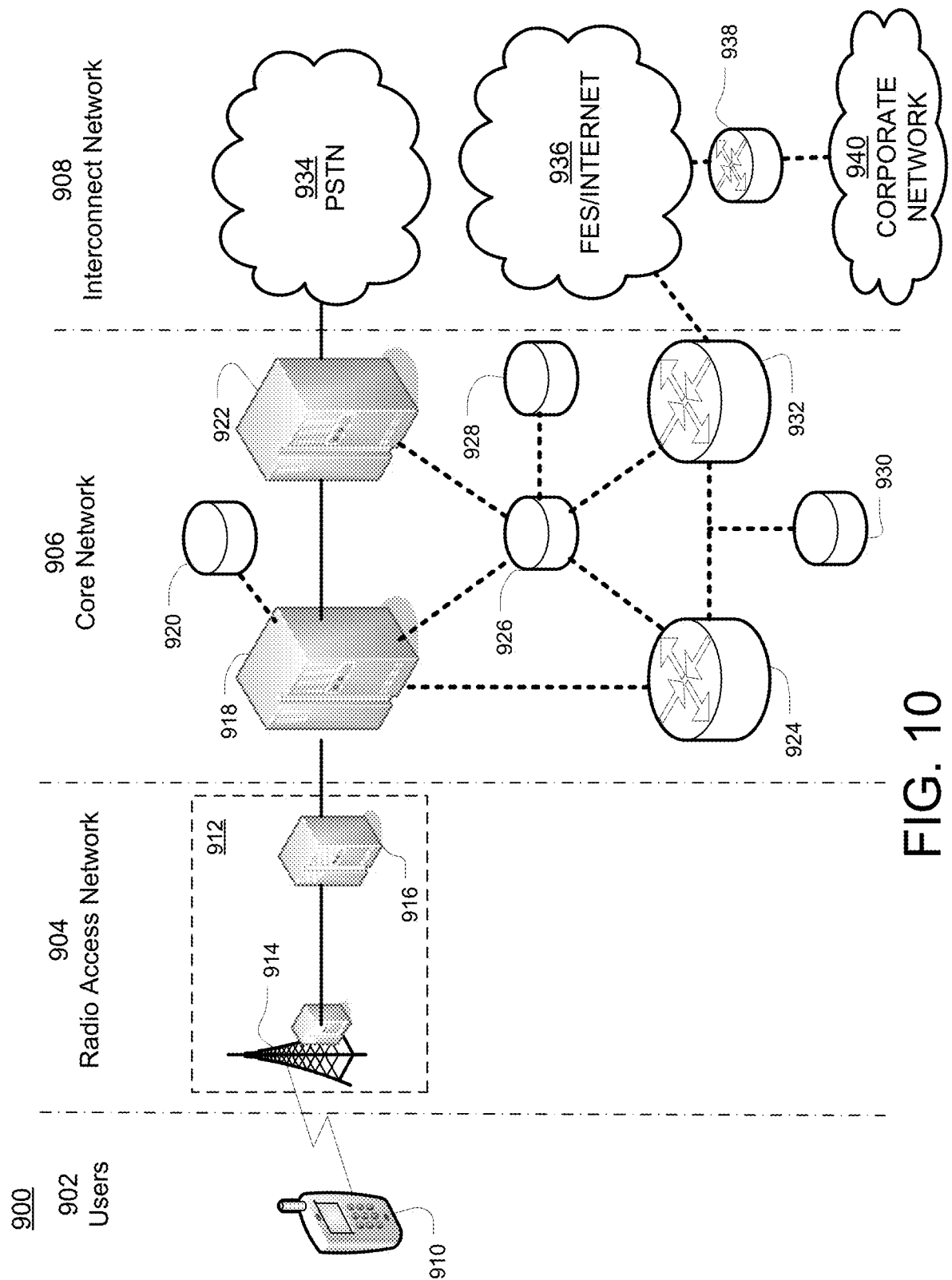
FIG. 10 illustrates an exemplary architecture of a GPRS network.

FIG. 10 illustrates an architecture of a typical GPRS network 900 that may be connected with or associated with system 110 for dynamic provisioning of cloud storage, as discussed herein. The architecture depicted in FIG. 10 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 10. In an example, device 910 comprises a communications device (e.g., mobile device 109 for requesting provisioning, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 10, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 10, interconnect network 908 comprises a PSTN 934, an FES/Internet 936, a firewall 1038, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

HLR 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 10, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 1038, to reach corporate network 940.

Figure 11:
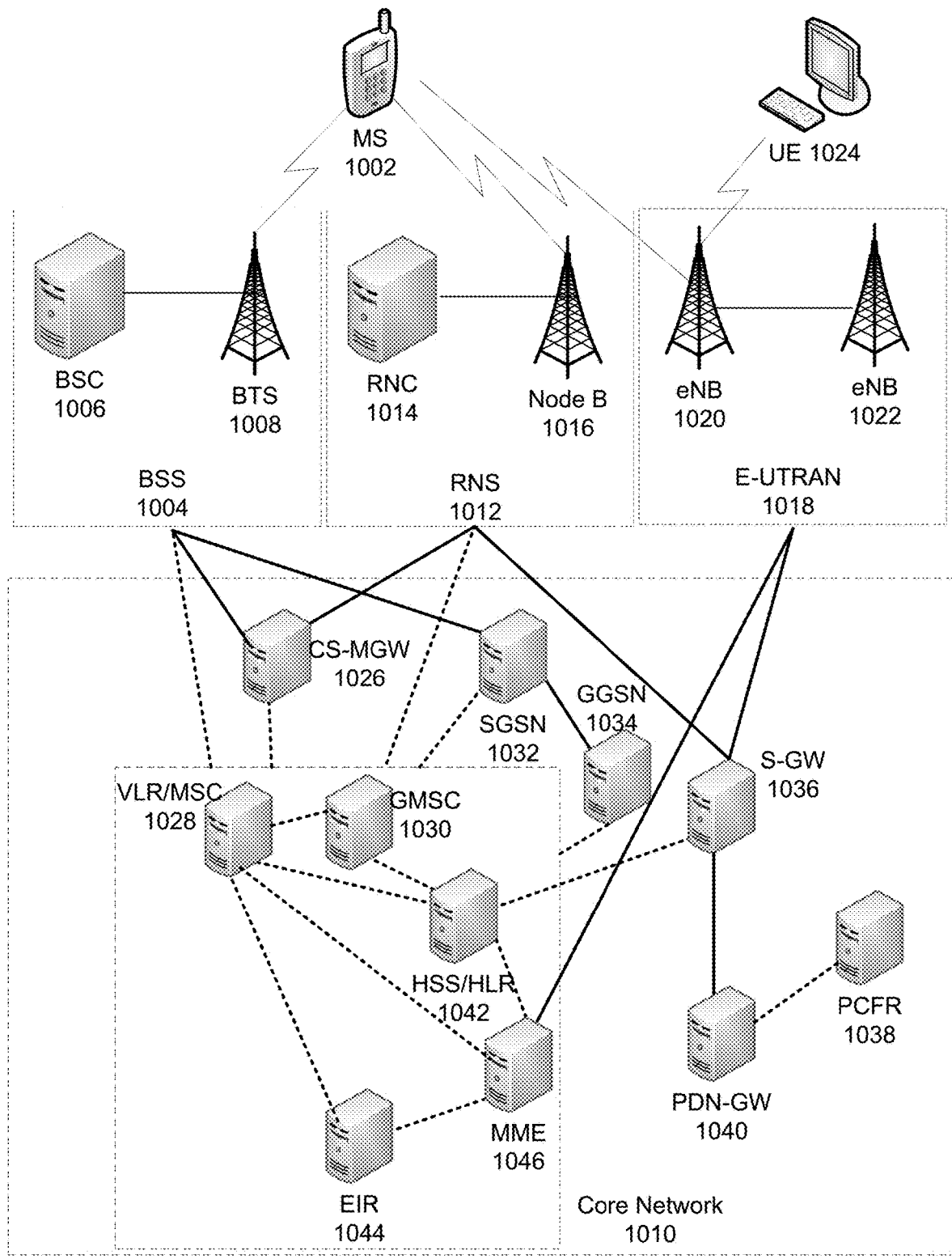
FIG. 11 is a block diagram of an exemplary public land mobile network (PLMN).

FIG. 11 illustrates a PLMN block diagram view of an example architecture of a telecommunications system that may be used by system 110 with regard to dynamic provisioning. In FIG. 11, solid lines may represent user traffic signals, and dashed lines may represent support signaling. MS 1002 is the physical equipment used by the PLMN subscriber. For example, node 141, node 142, mobile device 109, one or more components of system 110, network device 300, the like, or any combination thereof may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile phone, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically, MS 1002 may communicate with any or all of BSS 1004, RNS 1012, or E-UTRAN 1018. In a illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched MGW function (CS-MGW) 1026 is part of core network 1010 and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS 1042 is a database for user information and stores subscription data regarding MS 1002 or UE 1024 for handling calls or data sessions. Networks may contain one HSS 1042 or more if additional resources are required. Example data stored by HSS 1042 include, but is not limited to, user identification, numbering or addressing information, security information, or location information. HSS 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. GMSC server 1030 may serve as a connection to alternate GMSC servers for other MSs in larger networks.

EIR 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software defined network (SDN) and a simple IP are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a telecommunications system in which emergency alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes an device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

In the context of what is discussed herein with regard to computer storage, the standard RAID levels comprise a basic set of RAID (redundant array of independent disks) configurations that employ the techniques of striping, mirroring, or parity to create large reliable data stores from multiple general-purpose computer hard disk drives (HDDs).

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While a telecommunications system has been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, a telecommunications system as described herein should not be limited to any single example, but rather should be construed in breadth and scope in accordance with the appended claims.

In describing preferred methods, systems, or apparatuses of the subject matter of the present disclosure—dynamic provisioning of cloud storage—as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

What is claimed:

1. An apparatus comprising:
   a processor; and
   a memory coupled with the processor, the memory comprising executable instructions that when executed by the processor cause the processor to effectuate operations comprising:
      receiving a first request of a plurality of requests associated with a cloud storage;
      selecting a first node of a plurality of nodes based on information associated with the first request;
      configuring the first node based on information associated with the first request to create a first storage implementation on the first node to support the first request;
      receiving a second request of the plurality of requests associated with the cloud storage;
      selecting the first node based on information associated with the second request; and
      configuring the first node based on information associated with the second request to create a second storage implementation on the first node to support the second request.

2. The apparatus of claim 1, further operations comprising:
   determining whether the first storage implementation or the second storage implementation are a software-RAID based storage implementation;
   monitoring the first storage implementation or the second storage implementation to determine whether a service level agreement (SLA) violation has been observed in the first storage implementation or the second storage implementation; and
   in response to an SLA violation being observed for the first storage implementation or the second storage implementation, throttling storage traffic sharing the first storage implementation or the second storage implementation.

3. The apparatus of claim 1, wherein the first storage implementation and the second storage implementation are different.

4. The apparatus of claim 1, wherein the information associated with the first request comprises a type of volume needed and a storage requirement.

5. The apparatus of claim 1, the operations further comprising:
   receiving a third request;
   determining information associated with the first node, wherein the information associated with the first node comprises at least one of: a number of disks for the first node, disk types for the first node, and mediums for the first node;
   determining whether the first node meets criteria for the third request based on the information associated with the first node and the information associated with the first request and the information associated with the second request; and
   in response to determining that the first node meets the criteria for the third request, configuring the first node based on information associated with the third request to create a third storage implementation on the first node to support the third request.

6. The apparatus of claim 1, the operations further comprising:
   receiving a third request;
   determining information associated with the first node, wherein the information associated with the first node comprises at least one of: a number of disks for the first node, disk types for the first node, and mediums for the first node;
   determining whether the first node meets criteria for the third request based on the information associated with the first node and the information associated with the first request and the second request; and
   in response to determining that the first node cannot meet the criteria for the third request, configuring a second node based on information associated with the third request to create a first storage implementation on the second node to support the third request.

7. The apparatus of claim 1, further operations comprising:
   determining whether the first storage implementation or the second storage implementation are a containerized storage implementation; and
   responsive to the first storage implementation or the second storage implementation being a containerized storage implementation, inserting a pre-computed performance budget into a file inside the containerized storage implementation.

8. The apparatus of claim 1, further operations comprising:
   determining the first storage implementation or the second storage implementation are a containerized storage implementation; and instantiating a dynamic throttling service in each container of the containerized storage implementation.

9. A system comprising:
a provisioning device, the provisioning device comprising:
a processor; and
a memory coupled with the processor, the memory comprising executable instructions that when executed by the processor cause the processor to effectuate operations comprising:
receiving a first request of a plurality of requests associated with a cloud storage;
selecting a first node of a plurality of nodes based on information associated with the first request;
configuring the first node based on information associated with the first request to create a first storage implementation on the first node to support the first request;
receiving a second request of the plurality of requests associated with the cloud storage;
selecting the first node based on information associated with the second request; and
configuring the first node based on information associated with the second request to create a second storage implementation on the first node to support the second request.

10. The system of claim 9, further operations comprising:
determining whether the first storage implementation or the second storage implementation are a software-RAID based storage implementation;
monitoring the first storage implementation or the second storage implementation to determine whether a service level agreement (SLA) violation has been observed in the first storage implementation or the second storage implementation; and
in response to an SLA violation being observed for the first storage implementation or the second storage implementation, throttling storage traffic sharing the first storage implementation or the second storage implementation.

11. The system of claim 9, wherein the first storage implementation and the second storage implementation are different.

12. The system of claim 9, wherein the information associated with the first request comprises a type of volume needed and a storage requirement.

13. The system of claim 9, the operations further comprising:
receiving a third request;
determining information associated with the first node, wherein the information comprises at least one of: a number of disks for the first node, disk types for the first node and mediums for the first node;
determining whether the first node meets criteria for the third request based on the information associated with the first node and the information associated with the first request and the second request; and
in response to determining that the first node meets the criteria for the third request, configuring the first node based on information associated with the third request to create a third storage implementation on the first node to support the third request.

14. The system of claim 13, the operations further comprising, in response to determining that the first node cannot meet the criteria for the third request, configuring a second node based on information associated with the third request to create a first storage implementation on the second node to support the third request.

15. The system of claim 9, further operations comprising:
determining whether the first storage implementation or the second storage implementation are a containerized storage implementation; and
inserting a pre-computed performance budget into a file inside the containerized storage implementation.

16. The system of claim 15, further operations comprising instantiating a dynamic throttling service in each container of the containerized storage implementation.

17. A method comprising:
receiving, by a provisioning device, a first request of a plurality of requests associated with a cloud storage;
selecting, by a storage broker or a storage manager, a first node of a plurality of nodes based on information associated with the first request;
configuring, by the storage broker or the storage manager, the first node based on information associated with the first request to create a first storage implementation on the first node to support the first request;
receiving, by the provisioning device, a second request of the plurality of requests associated with the cloud storage;
selecting, by the storage manager, the first node based on information associated with the second request; and
configuring, by the storage manager, the first node based on information associated with the second request to create a second storage implementation on the first node to support the second request.

18. The method of claim 17, further comprising:
determining whether the first storage implementation or the second storage implementation are a software-RAID based storage implementation;
monitoring the first storage implementation or the second storage implementation to determine whether a service level agreement (SLA) violation has been observed in the first storage implementation or the second storage implementation; and
in response to an SLA violation being observed for the first storage implementation or the second storage implementation, throttling storage traffic sharing the first storage implementation or the second storage implementation.

19. The method of claim 17, further comprising:
receiving a third request;
determining information associated with the first node, wherein the information comprises at least one of: a number of disks for the first node, disk types for the first node and mediums for the first node;
determining whether the first node meets criteria for the third request based on the information associated with the first node and the information associated with the first request and the second request; and
in response to determining that the first node meets the criteria for the third request, configuring the first node based on information associated with the third request to create a third storage implementation on the first node to support the third request.

20. The method of claim 17, further comprising:
determining whether the first storage implementation or the second storage implementation are a containerized storage implementation; and inserting a pre-computed performance budget into a file inside the containerized storage implementation.

\* \* \* \* \*